United States Patent [19]

Mochizuki

[11] 4,417,490
[45] Nov. 29, 1983

[54] LATHE TOOL CALIBRATOR AND METHOD

[75] Inventor: Minoru Mochizuki, Indianapolis, Ind.

[73] Assignee: Hurco Mfg. Co., Inc., Indianapolis, Ind.

[21] Appl. No.: 272,022

[22] Filed: Jun. 9, 1981

[51] Int. Cl.³ ............................ B23B 1/00; B23B 7/00
[52] U.S. Cl. ........................................ 82/2 B; 82/1 C
[58] Field of Search ...................... 82/1 R, 2 B, 34 R; 33/181 R, 182, 185 R; 408/3

[56] References Cited

U.S. PATENT DOCUMENTS

| | | | |
|---|---|---|---|
| 3,171,327 | 3/1965 | Williamson | 408/3 X |
| 3,350,966 | 11/1967 | Moulton | 82/2 B X |
| 3,481,247 | 12/1969 | Hayes | |
| 3,578,868 | 5/1971 | Wopkemeter | 33/185 X |
| 3,580,129 | 5/1971 | Austin | 82/2 B |
| 3,636,814 | 1/1972 | Esch | 82/1 R |
| 3,641,849 | 2/1972 | Kinney | 82/2 B |
| 3,704,641 | 12/1972 | Rhoades | 82/2 B X |
| 3,727,493 | 4/1973 | Lahm | 82/2 B X |
| 3,888,015 | 6/1975 | Williams | 33/185 R |
| 4,018,113 | 4/1977 | Blazenin et al. | 82/2 B |

*Primary Examiner*—W. D. Bray
*Attorney, Agent, or Firm*—Woodard, Weikart, Emhardt & Naughton

[57] ABSTRACT

A tool calibrator and method including a gauge head with a surface for chucking in a workpiece holder on a machine lathe. A plurality of contact surfaces on the gauge head function to contact the tool cutting edge when moved transverse to and parallel to the rotational axis of the workpiece holder. Electrical sensing circuitry detect resulting contacts and relay the same to the numerical control circuitry of the lathe for automatically determining relative position of the tool cutting edge. This input data is used to control movement of the tool in its tool holder after the gauge head has been removed and a workpiece mounted for the machining operation.

16 Claims, 8 Drawing Figures

LATHE TOOL CALIBRATOR AND METHOD

BACKGROUND OF THE INVENTION

The present invention relates generally to numerical control lathes, and more particularly, to an apparatus and method for lathe tool calibration, i.e., for determining relative position of the cutting edge on a numerical control lathe tool used for turning, facing, boring, or similar operations.

Lathes are well known and have been used in machining for many years. Lathes necessarily include a base or frame, a spindle chuck or other holder for holding and rotating a workpiece about an axis, and a turret or other holder for securing one or more cutting tools on the lathe frame. The cutting tool itself, in its tool holder, is generally movable in two directions transverse to and parallel to the axis of rotation of the spindle chuck in order to accomplish the machining operation on the workpiece.

Automated machine tools such as turret lathes are also commonplace, employing a control system commonly referred to as a numerical control or a computer numerical control. Explained simply, these controls function to command movement of the cutting tool or the workpiece itself per previously programmed numerical instructions to produce a finished product that is machined to precise dimension and configuration. Control of workpiece and tool holder speeds, feeds and various other functions are handled by the numerical control through proper programming.

A major problem of numerically controlled lathes is their inability to monitor location of the point or edge on the cutting tool. Although the numerical control does constantly monitor the movement of the cross slide and carriage of the lathe, it cannot monitor the actual position of the tool point. With conventional NC lathes, as they are often called, the programmer has to know the positions of these tool points relative to a certain fixed point on the turret, or other tool holder, for all of the cutting tools being used in the machining operation. The programmer uses this information in programming the movement of cross slides and carriages on the lathe to accomplish the desired machining.

One conventional method to achieve tool setting and alignment has been to use only so-called "qualified tools." This term refers to a combination of dimensionally controlled tool bits and tool holders which are available on the market, having their dimensions predetermined by the manufacturer. The accuracy of this type of tool is such that for ordinary machining, it is probably sufficient to use the nominal dimensions of the tools which are published by the tool manufacturer in programming the numerical control. The problem with this method is that tool selection is limited, and that the attainable accuracy in the machining is dependent upon the degree of accuracy observed by the manufacturer. In addition, there is no way for the manufacturer to account for deviations caused by tool wear, mounting misalignment by the programmer and the like.

A second conventional method has been to calibrate each cutting tool at what is normally referred to as a tool presetting gage. This is done on an off-line basis at a location away from the lathe. Examples include the disclosures in U.S. Pat. No. 3,490,318 issued to McKenzie Jones, U.S. Pat. No. 3,888,015 issued to Williams, U.S. Pat. No. 3,578,868 issued to Wopkemeier, and U.S. Pat. No. 3,580,129 issued to Austin. Besides being time consuming, these methods have the inherent problem of inaccuracies resulting from the cutting tool being measured at some remote gauging stand and then being moved to the lathe where it is again mounted in a turret or other holding device.

A third conventional method has been to make a small cut on the workpiece with the cutting tool, and then to measure this diameter to establish the relative radial position of the tool point against the tool post or holder. In a horizontal bed lathe, this measurement corresponds to the X-axis calibration coordinate. For calibration in the lengthwise direction, i.e., the Z-axis coordinate parallel to the rotational axis of the workpiece, a small cut in the end of the workpiece is taken. These measurements are input to the numerical control which, in turn, automatically compensates for the true position of the cutting edge of the tool. Although calibration is done with the cutting tool on the lathe, this method also suffers from being cumbersome and time consuming because the operator has to make cuts, measure the diameter or lengthwise position of the machined surfaces, and then input this data to the numerical control through keyboard or other means in order to compensate for dimensional errors in the cutting tool. These problems are, of course, magnified when multiple cutting tools are used on the lathe, as is often the case.

A fourth conventional method has been to employ a microscope mounted on a certain fixed point of the lathe. After initially mounting the cutting tool in its holder, the operator locates the tip or point of the tool in the field of view and inputs its relative position into the control system. A problem with this method is once again the complexity of the procedure in addition to the cumbersome mounting and handling of the microscope in most instances.

Tool point deviation detectors are also known to the machining industry. These devices measure or presume tool length, with this length being programmed into the machine control. The control attempts to automatically bring the cutting tool to a predetermined position, whereupon tool length deviation is somehow measured and input back to the control. Detection methods of this kind are disclosed in a patent issued to Rhoades, U.S. Pat. No. 3,704,641 (utilizing an electromagnetic transducer); a patent issued to Kinney, U.S. Pat. No. 3,641,849 (relying upon contact between the cutting tool and a conductive calibration block); and a patent issued to Blazenin et al., U.S. Pat. No. 4,018,113 (which uses a solid state line scan camera). Besides complexity, one disadvantage of these deviation detectors is that tool length must be initially input to the control so that deviation can be detected. This requires prior measurement either before or after the tool is mounted in its holder, and in this way again complicates the job of the operator.

SUMMARY OF THE INVENTION

The drawbacks encountered with conventional measuring techniques are eliminated with the present invention, which provides a simple and efficient apparatus and method for calibrating a cutting tool to determine relative position of its cutting edge after being mounted on a numerical control lathe.

Described briefly according to a typical embodiment, a tool calibrator and method having a gauge head with a surface for chucking in a workpiece holder on the lathe. A plurality of contact surfaces on the gauge head function to contact a cutting edge on the tool when it is moved, in directions transverse to and parallel to the axis of rotation of the workpiece holder. Sensing means accompany these surfaces for detecting contacts and for relaying the same to the numerical control circuitry of the lathe for automatically determining the relative position of the tool-cutting edge. With this input data stored in the control memory, the gauge head is removed, a workpiece mounted, and machining begun.

DESCRIPTION OF THE PREFERRED EMBODIMENT

Figure 1:
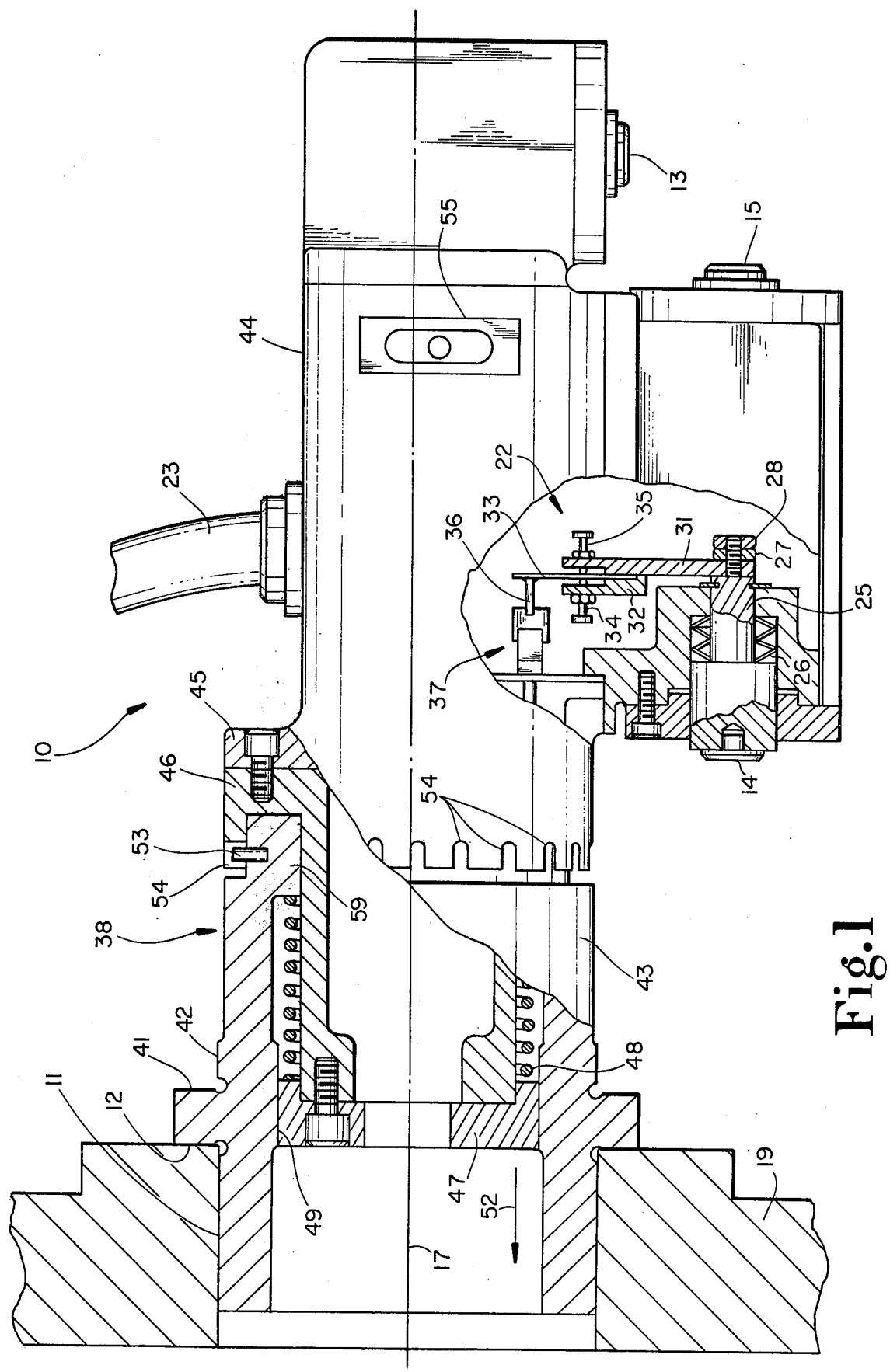
FIG. 1 is a top plan view of the tool calibrator according to the preferred embodiment of this invention, with portions broken away to reveal inner construction.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations in the illustrated device, and such further applications of the principles of the invention as illustrated therein being contemplated as would normally occur to one skilled in the art to which the invention relates.

Additionally for purposes of understanding, description of the embodiment will be made in connection with its use with a horizontal bed lathe, chucker or similar machine tool. It is understood that this description is by way of example only, the embodiment being equally suited for use with vertical or otherwise-oriented lathes or turning or boring machined tools.

Machine tools of this kind have in common some base or frame provided with a head stock with a motor or other drive means for driving a chuck or other holder for holding and rotating a workpiece about a particular axis of rotation. A carriage and tail stock are often mounted on rails or other means on the bed of the frame for accommodating driven movement parallel to and along the axis of rotation. A turret or other tool holder independent of the carriage or mounted on a cross slide holds one or more cutting tools on the carriage accommodates driven movement in a direction transverse to the axis of rotation. Regardless of the lathe's precise construction, however, means are included for indexing a cutting tool in its holder in directions both transverse to and parallel to the rotational axis of the workpiece in order to accomplish turning, facing, boring and other machining operations. The embodiment of applicant's invention described below is useable with all such machined tools, but not for the limited purpose of comparative measuring or deviation detection or tool misalignment from presetting at some remote station. On the contrary, applicant's invention requires no tool presetting or measuring. It accomplishes high-precision measuring and positioning of an operative edge on a cutting tool after it is mounted on a numerical-control lathe.

Referring now to FIG. 1 showing one embodiment of the lathe tool calibrator of the present invention, gauge head 10 has two surfaces 11 and 12 for chucking the gauge head in a spindle chuck or other workpiece holder 19 on the machine lathe. These surfaces are perpendicular to aid in proper alignment and positioning of the gauge head with repeated use.

Figure 2:
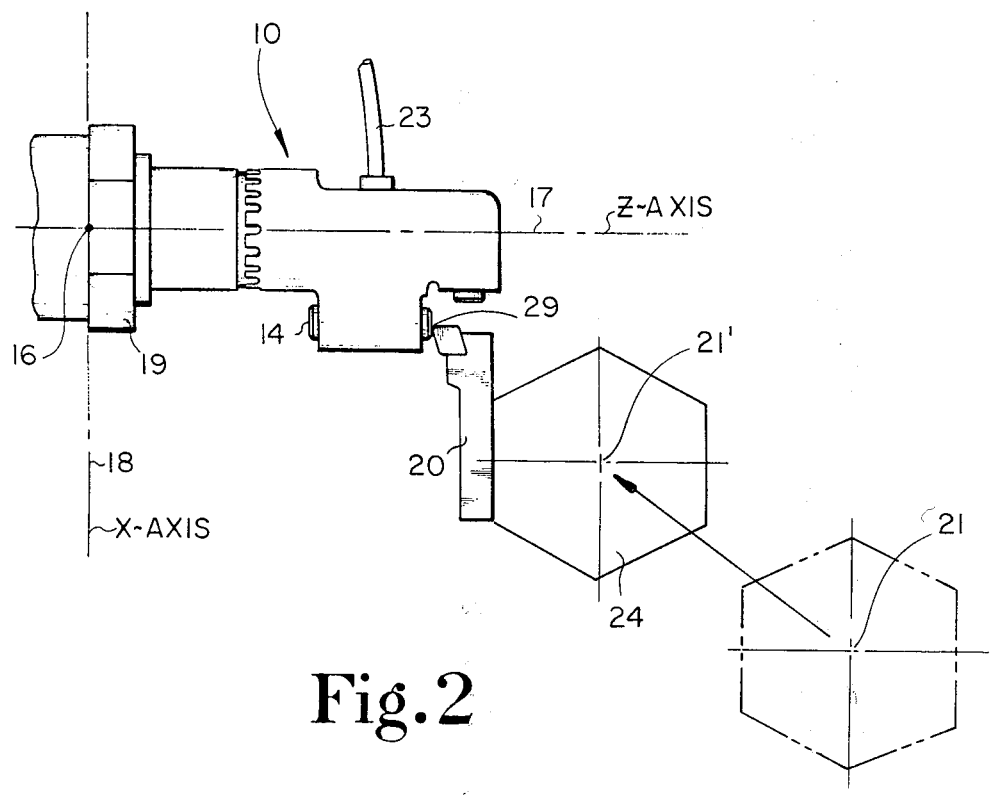
FIG. 2 is a partial top plan view of the tool calibrator chucked in a machine lathe and depicting a step taken in measuring tool length to precisely determine position of the cutting edge relative to the machine lathe.

Contact or feeler surfaces 13, 14, and 15 are provided on gauge head 10 for contacting an operative edge on a cutting tool previously mounted in a turret or other tool holder on the lathe. The number and orientation of these contact surfaces is better understood after considering the coordinate system used in programming and operation of machine tools of this type. Referring to FIG. 2, a machine zero point 16 is chosen on the rotational axis of the workpiece in its holder, and the position of this point is stored in the numerical control. A coordinate system is established from point 16 with rotational axis 17 of the workpiece commonly thought of as the Z axis, with axis 18 in the plane of FIG. 2 the X axis. Absolute position coordinates can be calculated for a particular cutting tool 20 by determining the position of its cutting edge 29 within the coordinate system relative to known points on the machine, such as zero point 16 and reference point 21 on the tool holder.

Contact surface 13 on gauge head 10 corresponds to the X axis feeler surface in the disclosed embodiment, whereas contact surfaces 14 and 15 corresponding to the left and right Z axis feeler surfaces, respectively. Two Z-axis surfaces are used in preferred gauge head 10 to measure cutting tools requiring feeding from either direction parallel to axis 17. A single X-axis feeler surface is preferred because gauge head 10 can be readily indexed 180 degrees about axis 17 so that both ID and OD cutting tools can be measured with the disclosed embodiment. It is, of course, within the scope of the invention that any number of contact surfaces can be provided, limited only by the criteria of permitting calibration of cutting tools of all configurations and kinds.

Sensing means 22 accompany each contact surface 13, 14 and 15 to detect contacts with the cutting edge on a tool mounted on the lathe. Means 22 relay these sensed contacts to the logic circuitry of the numerical control as, for example, through electrical cable 23 shown in FIGS. 1 and 2. Knowing the distance between each contact surface and some point 16 on the lathe, and also knowing the distance traveled by some point 21 on tool holder 24 to initiate contact, the computer in the numerical control automatically calculates the position coordinates of cutting edge 29 relative to holder 24 and to the lathe. For example, FIG. 2 shows a typical calibration in which tool holder 24 moves from a home position 21 to a new position 21' to contact feeler surface 15 with cutting edge 29. The result of this contact, and the automatic computation thereafter made and stored in the control memory, is the precise measurement and positioning of the Z-axis coordinate of the tool cutting edge relative to the lathe. The end result of the entire calibration process is an absolute measurement of the dimensions of the cutting edge on the tool, and a set of X and Z coordinates locating the precise position of the tool point or edge relative to the lathe.

In the embodiment of gauge head 10, sensing means 22 includes an elongated pressure foot or stem 25 and spring 26 supporting each contact surface so that the operator need not be concerned of damaging the calibrator when making contact with the cutting tool and these contact surfaces. As shown in FIG. 1 in connection with surface 15, stem 25 is connected by dual-locking nuts 27 and 28 to a first and second plate arrangement identified by numerals 31 and 32 in the figure. A third plate 33 is positioned within a gap between the first and second plates and fine adjustment screws 34 and 35 are provided to adjust the position of plate 33 within this gap. Secured to the opposite end of plate 33 by arm 36 is the interrupt plate of a photodiode device 37 which is electrically connected through cable 23 to relay electrical signals to the logic circuitry of the numerical control. In preferred gauge head 10, device 37 is a General Electric Photon Coupled Interrupter, Model No. H21B. Alternate sensing means equally acceptable for use with the calibrator of this invention include simple contacts, induction-type switches, limit- or micro-switches and the like. The importance of means 22 is that it senses contact between the cutting edge and the contact surface and immediately relays this information to the numerical control for precise calculation of the tool position for later machining operations.

An additional feature of the disclosed embodiment is the provision of means 38 to minimize effects from parallelism and eccentricity when gauge head 10 is chucked in the lathe. This is accomplished after the guage head is initially chucked, at which point surfaces 11 and 12 are butted against the jaws of the lathe chuck 19. Corresponding surfaces 41 and 42 are then checked by use of a dial indicator for effects from parallelism and eccentricity, which are often unavoidable in chucking of a part such as gauge head 10. If parallelism is found sufficiently off, it may be necessary to use a shim of some kind placed between chuck 19 and surface 12. At that point, the operator manually turns on the lathe spindle aligning the high point of eccentricity of gauge head 10 in the plane perpendicular to the plane of movement of the tool cutting edge. In a horizontal bed lathe, this would be the vertical plane through axis 17 and perpendicular to the plane of FIGS. 1 and 2.

To accomplish this added feature, gauge head 10 has two principal sections, a base or chucking head 43 and a measuring head 44. Measuring head 44 is constructed with a first casing 45 attached to an annular ring 46 and inner end plate 47 slidable against the inner surface 49 of base 43, as shown in FIG. 1. Spring 48 is in compression between end plate 47 and an inner-turned flange 59 on base 43, and provides force in the direction of arrow 52 tending to hold the base and measuring head together. Pin 53 fits interchangeably within a number of notches 54 spaced at 5-degree intervals around ring 46 on the measuring head.

After the high point of eccentricity has been located and moved to the proper plane, the operator physically pulls measuring head 44 toward the right in FIG. 1 to defeat spring 48 and free pin 53 from the notches 54 on ring 46. The operator then indexes measuring head 44 about its rotational axis 17 until contact surfaces 13, 14 and 15 come approximately within the plane of approach of the cutting tool or tools. Releasing the measuring head re-engages the notch and pin arrangement. Level gauge 55 is provided in measuring head 44 to enable the operator to then manually turn the spindle to locate the contact surfaces precisely in the horizontal plane in the case of a horizontal bed lathe. At that time, the operator can proceed with tool measurement and positioning by contacting the cutting edge of the mounted tool with the X-axis and Y-axis feeler surfaces as described above. When calibration is complete, gauge head 10 is removed from the lathe chuck, a workpiece is inserted, and the machining operation is begun.

Figure 3:
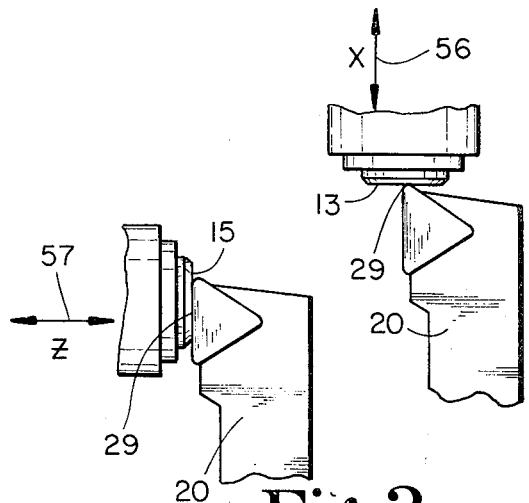
FIG. 3 is a partial close-up view of cutting edges of a lathe tool contacting feeler surfaces according to the preferred calibrator and method of this invention.
Figure 4:
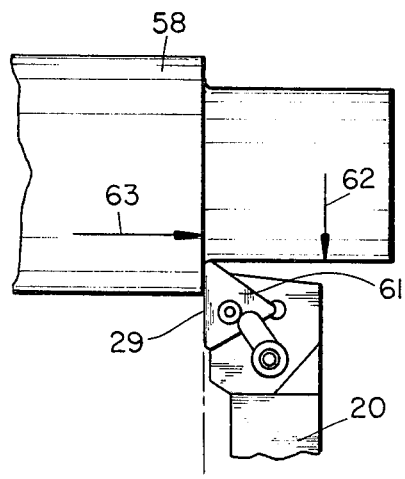
FIGS. 4–8 are fragmented views of typical cutting tools capable of measurement and calibration using the present invention.

Referring to FIG. 3, there is shown a close-up view of cutting edge 29 of tool 20 brought into contact with surfaces 13 and 15 in a two-step operation to precisely measure and position the tool prior to machining a workpiece. The X-axis coordinate 56 and Z-axis coordinate 57 are both primary or critical dimensions of the tool point 29 measured in the two views in the figure. The reason for that is because tool 20 in FIG. 3 can be used to machine either a new diameter or a new shoulder on a workpiece. These are the two basic functions of a cutting tool, and are shown in FIG. 4 in which cutting tool 20 is used to machine new diameter 64 and new shoulder 65 on workpiece 58. As shown in these two figures, the two-dimensional measurement capability provided by applicant's calibrator is sufficient to establish tool point location even for tools versatile enough for use in multiple machining functions.

Figure 5:
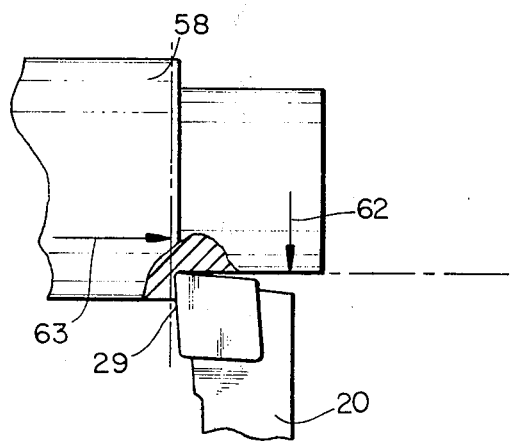
Figure 6:
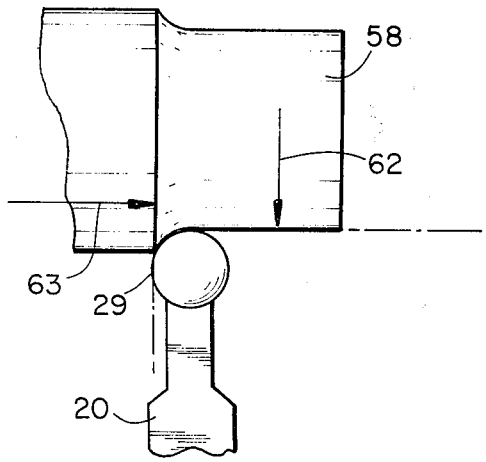
Figure 7:
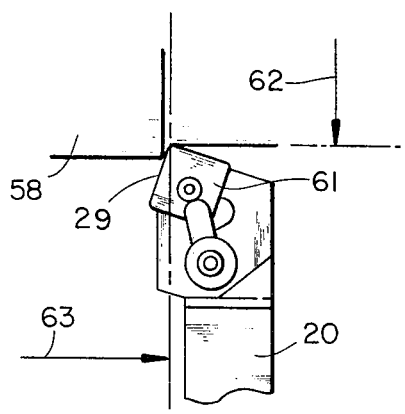
Figure 8:
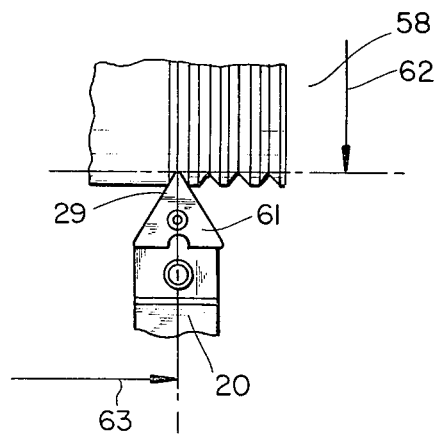

Referring now to FIGS. 5-8, a variety of lathe tools 20 are shown with their cutting edges 29 machining a workpiece 58. The cutting tools shown in FIGS. 7 and 8 are typical of many tools now used in industry with removable or replaceable cutting tips 61 secured to an otherwise standard tool 20. In calibrating tools of this type, the programmer need consider the end result desired in determining which of the two-dimensional measurements is of primary concern. For example, in the threading operation depicted in FIG. 8, the X-axis coordinate depicted by arrow 62 is the critical dimension because the depth of each thread is crucial while the precise configuration of its side walls is not. The programmer would therefore precisely calibrate the X-axis coordinate position of tool point 29 in FIG. 8 using applicant's calibrator, whereas he could approximate the Z-axis measurement using applicant's calibrator, the manufacturer's specifications or some other known means. Similarly, the critical measurement in the turning operations depicted in FIGS. 5, 6 and 7 are all the X-axis measurements depicted by arrows 62. The Z-axis measurements depicted by arrows 63 are of secondary, or less critical, concern to the particular operation being performed.

Of course, primary versus secondary considerations can understandably change when similar or different tools are used for other machining operations. The important point is only that the two-dimensional measurement capability provided by applicant's calibrator is sufficient to permit precise measurement of the primary dimension of any cutting tool involved in a particular machining operation. This information is then inputted into the control system of the lathe from which movements are governed to accomplish the machining operation with precision and accuracy heretofore attainable only through cumbersome procedures. Moreover, once proper alignment has been attained, applicant's calibrator can simply be unchucked from the lathe and set aside until further set-up or measurement operations are required.

The preferred method of applicant's calibration invention is clear from the above description. In particular, gauge head 10 is first chucked in the jaws of a lathe chuck 19 and surfaces 41 and 42 are checked with a dial indicator for effects of parallelism and eccentricity. Once compensation is made for these conditions, if any is needed, the operator is ready to calibrate the cutting tool or tools which he plans to use in the particular operation. This tool, or tools, having been securely mounted in their turret or other tool holder or carriage, are brought one by one to the point where contact is made between the cutting edge and the contact surface 13 and either of the contact surfaces 14 or 15. As contact is made with each respective surface, appropriate X-axis and Z-axis coordinate data are input through electrical cable 23 into the numerical control for the lathe. This information is assimilated and precise coordinate position of the cutting edge of the tool computed so that subsequent movements can be governed by the control to accomplish the machining operation desired with precision and accuracy. Once calibration is complete, head gauge 10 is removed from the chuck and set aside until subsequent calibrations are required.

While the invention has been illustrated and described in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A calibrator for determining relative position of a cutting tool on a numerical control lathe, comprising:
   (a) a gauge head with means including a surface for chucking the calibrator in a workpiece holder on the lathe;
   (b) a plurality of contact surfaces on said gauge head for contacting a cutting edge on the tool; and
   (c) sensing means for detecting contact of the tool cutting edge with said contact surfaces on said gauge head and for relaying said sensed contacts to the numerical control circuitry of the lathe for automatically determining the position of the tool cutting edge.

2. The calibrator in claim 1 in which said contact surfaces are of known position relative to the lathe and said gauge head.

3. The calibrator in claim 1 in which said contact surfaces are positioned on said gauge bead to contact the tool cutting edge when the tool is moved transverse to and parallel to the axis of rotation of the workpiece holder on the lathe.

4. A calibrator for determining relative position of a cutting tool on a numerical control lathe, comprising:
   (a) a gauge head with a surface for chucking in a workpiece holder on the lathe;
   (b) a plurality of contact surfaces on said gauge head for contacting a cutting edge on the tool; and
   (c) sensing means for detecting said contacts and for relaying said sensed contacts to the numerical control circuitry of the lathe for automatically determining the position of the tool cutting edge, said contact surfaces include a first surface for contacting the tool cutting edge when moved transverse to the rotational axis of the workpiece holder, and a pair of oppositely-facing second contact surfaces for contacting the tool cutting edge when moved parallel to the rotational axis of the workpiece holder.

5. The calibrator in claim 4 in which said gauge head has a common axis of rotation with the workpiece holder on the lathe.

6. A calibrator for determining relative position of a cutting tool on a numerical control lathe, comprising:
   (a) a gauge head with a surface for chucking in a workpiece holder on the lathe;
   (b) a plurality of contact surfaces on said gauge head for contacting a cutting edge on the tool; and
   (c) sensing means for detecting said contacts and for relaying said sensed contacts to the numerical control circuitry of the lathe for automatically determining the position of the tool cutting edge, and additionally including means to minimize effects from parallelism and eccentricity when said gauge head is chucked in the workpiece holder on the lathe.

7. The calibrator in claim 6 in which said means includes:
   (a) first and second perpendicular chucking surfaces on a base portion of said gauge head for abutting against the workpiece holder on the lathe;
   (b) first and second perpendicular gauging surfaces on said base portion for checking parallelism; and
   (c) a measuring head spring-tensioned against said base portion on said gauge head and including means for defeating said tensioning and for indexing said measuring head about an axis to account for eccentricity of said gauge head.

8. The calibrator in claim 7 in which said means for defeating and for indexing includes an annular notched ring on said measuring head and a pin secured to said base portion on said gauge head for fitting within one of the notches on said ring.

9. The calibrator in claim 8 in which said relaying means includes a cable with electrical connection between said contact surfaces on said gauge head and the numerical control of the lathe.

10. The combination, comprising:
    (a) a numerical control lathe including a workpiece holder and a tool holder; and
    (b) the calibrator in claim 1.

11. The combination, comprising:
    (a) a numerical control lathe including a workpiece holder and a tool holder; and
    (b) the calibrator of claim 8.

12. A method for determining relative position of a cutting tool on a numerical control lathe, comprising the steps of:
    (a) chucking a surface on a gauge head in a workpiece holder on the lathe, the gauge head including a plurality of surfaces for contacting a cutting edge on the tool and sensing means for detecting the contacts and relaying the contacts to the numerical control circuitry of the lathe for automatically determining the position of the tool cutting edge; and
    (b) bringing the cutting edge of the tool into contact with a contact surface on the gauge head, the tool being mounted in a tool holder on the lathe.

13. The method in claim 12 comprising the additional step of correcting for effects of parallelism and eccentricity of the gauge head after said chucking and prior to said bringing.

14. The method in claim 13 in which said correcting includes defeating the spring-tensioned connection between the measuring head and the base portion of the gauge head and rotating the measuring head to correct for eccentricity.

15. The method in claim 1 in which said bringing includes moving the tool transverse to or parallel to the axis of rotation of the workpiece holder on the lathe.

16. The method in claim 15 in which said bringing includes moving the tool transverse to the rotational axis of the workpiece holder to contact a first contact surface, and moving the tool parallel to the rotational axis of the workpiece holder to contact one of a pair of oppositely-facing second contact surfaces.

* * * * *